United States Patent [19]

Laube

[11] 3,995,686
[45] Dec. 7, 1976

[54] ENERGY CONSUMPTION INDICATING SYSTEM

[76] Inventor: Herbert L. Laube, 120 Windcrest Drive, Camillus, N.Y. 13031

[22] Filed: June 5, 1975

[21] Appl. No.: 583,952

[52] U.S. Cl. .................................. 165/11; 62/125; 236/94
[51] Int. Cl.² ...................................... G01K 17/06
[58] Field of Search ............ 165/11; 62/125; 236/94

[56] References Cited
UNITED STATES PATENTS

| 1,566,290 | 12/1925 | Swift | 165/11 |
| 3,707,851 | 1/1973 | McAshan, Jr. | 165/11 |

Primary Examiner—Albert W. Davis, Jr.
Assistant Examiner—James D. Liles
Attorney, Agent, or Firm—Charles S. McGuire

[57] ABSTRACT

A system for use in multiple occupancy buildings wherein energy consumption for comfort heating or cooling is centrally metered to provide an indication of relative amounts of energy used by the individual occupancy units. An electrically operated elapsed time meter is associated with each occupancy unit having its own individual temperature control unit. The meter is actuated to record the time for which the temperature control unit is operating to consume energy for room heating or cooling purposes.

10 Claims, 4 Drawing Figures

3,995,686

ENERGY CONSUMPTION INDICATING SYSTEM

BACKGROUND OF THE INVENTION

The present invention relates to energy consumption indicating systems and is specifically directed to a system promoting the conservation of energy used for comfort heating and/or cooling purposes in multi-occupancy buildings wherein energy consumption is centrally metered.

In many multi-occupancy buildings, such as apartment or office buildings, the amount of energy consumed for comfort heating and/or cooling is measured only by a central meter, indicating total energy consumption for the entire building. The cost of the energy used is reflected in the rental or maintenance charges paid by the occupants, but is not pro-rated on the basis of the actual amounts of energy used by the respective tenants since there is no measurement of the respective amounts. In fact, some cities have ordinances requiring that the cost of electricity be included in the rental rate, in the case of all electrically heated apartments. Studies have shown that buildings wherein energy consumption is centrally metered regularly consume more energy per unit of space served than do buildings wherein energy use is individually metered, other conditions being equal. In most cases, the largest source of energy consumption in multiple-occupancy buildings is comfort temperature control. The energy used in altering the room air temperature, either by heating or cooling, often exceeds that for all other uses combined. Thus, significant energy savings could result from incentives provided to the individual occupants to limit the amount of energy used for comfort temperature control.

It is a principal object of the present invention to promote energy conservation by providing a system which allows the application of incentives to reduce the amount of energy consumed for comfort temperature control in centrally metered, multi-occupancy buildings.

It is also an object to provide a system which will indicate relative amounts of energy consumed by individual occupancy units of a multi-unit building without separately metering the quantities of energy respectively consumed.

Other objects will in part be obvious and will in part appear hereinafter.

SUMMARY OF THE INVENTION

In accordance with the foregoing objects, the invention includes means for measuring elapsed time during which energy is being consumed for comfort temperature control by each of the individual occupancy units. Although there is no sub-metering of the actual amount of energy consumed by the respective units, which may be legally prohibited, measurement of total elapsed time of energy consumption for heating or cooling purposes gives a quite accurate indication of the relative amounts of energy consumed thereby.

An elapsed time meter is connected in an electrical circuit which is closed to provide power to the meter whenever energy is being used to operate the unit which alters room air temperature to some desired level. A number of embodiments are desclosed of systems employing the invention in applications wherein the energy source is electricity, gas or oil. In any case, elapsed time shown on the meter is a reliable indication of the relative amounts of energy being used by a plurality of occupancy units.

DETAILED DESCRIPTION

Figure 1:
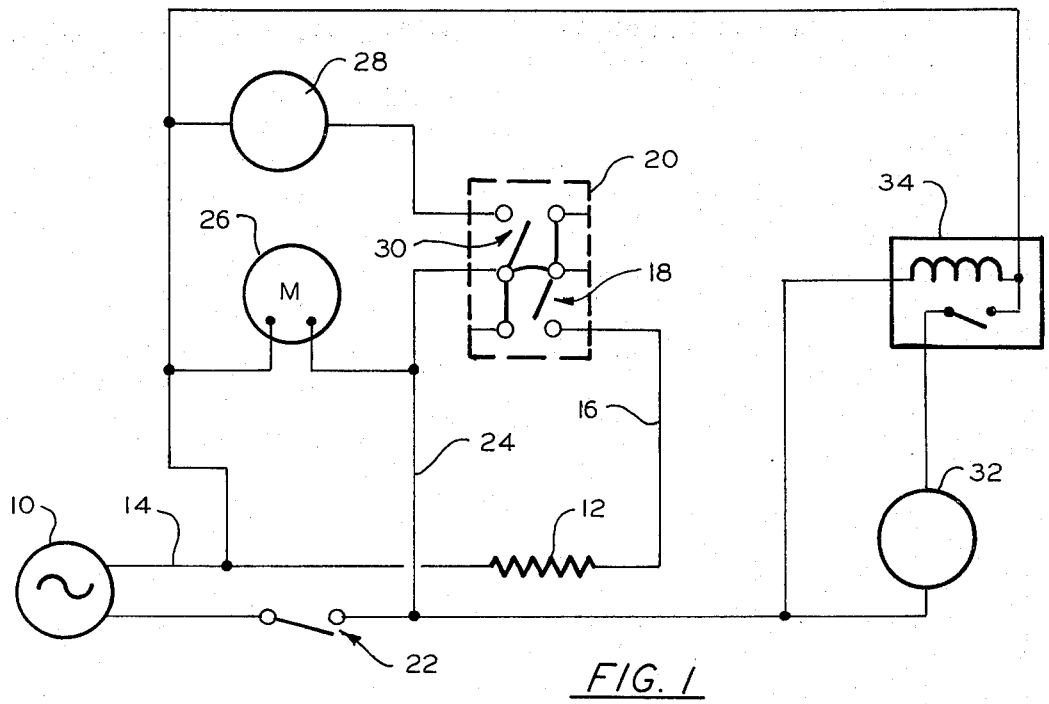
FIG. 1 is a schematic diagram showing a preferred form of the invention in an application wherein both heating and cooling are provided by electrically operated means.

In FIG. 1 a source of electrical power at an appropriate voltage level is indicated schematically at 10. Electrical resistance heater 12 is connected through line 14 to one side of source 10 and through line 16 to contacts 18 of thermostat 20. Switch 22 is manually movable between open and closed positions, and is arranged in line 24, through which thermostat 20 is connected to the other side of source 10. Fan motor 26 is connected across lines 14 and 24, and is thus operating whenever switch 22 is closed to circulate the heated or chilled air. Refrigerant compressor 28 is connected across lines 14 and 24 through contacts 30 of thermostat 20. The selective setting of thermostat 20 determines the temperature at which contacts 18 and 30 close to provide power to heater 12 and compressor 28, respectively, in accordance with conventional practice.

Elapsed time meter 32 is connected across source 10 through switch 22 on one side, and through relay 34 on the other. Meter 32, as well as the other schematically illustrated components in this and subsequent Figures, is of conventional construction, many suitable forms being commercially available. Relay 34 is of the current-sensitive type. It is normally open, an closes when current through the coil exceeds a predetermined value, in excess of the current level when only fan motor 26 is operating. That is, the contacts of relay 34 close to provide power to meter 32 only when either heater 12 or compressor 28 is in operation. The meter is in the nature of a clock which is running to accumulate the hours and minutes of energy used by the major power consuming elements of the temperature control system.

Figure 2:
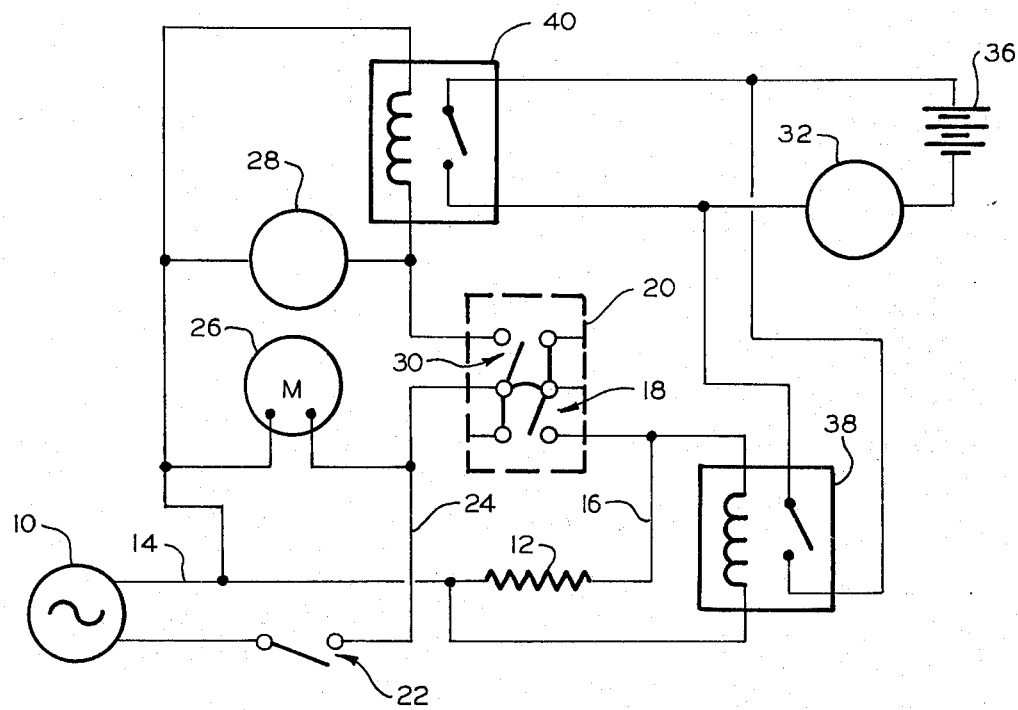
FIGS. 2-4 are also schematic diagrams showing the invention in other applications.

In FIG. 2, common reference numerals are used for those elements appearing also in FIG. 1. In this embodiment, elapsed time meter 32 is operated from an electrical power source 36, separate from source 10, with either of two relays 38 and 40 completing the circuit to operate meter 32. Source 36 may be a DC power supply, if desired, to allow operation with a DC-type meter. The coil of relay 38 is connected in the circuit of thermostat contacts 18, which close when room temperature drops to a preselected value to operate heater 12. The coil of relay 40 is connected to source 10 through thermostat contacts 30, which close to operate compressor 28 when room temperature reaches a preset maximum when the temperature control system is used in the cooling mode. Again, the normally open contacts of both relays 38 and 40 will close only when the current through the respective coils is in excess of that produced by operation of fan motor 26 alone. That is, either heater 12 or compressor 28 must be in operation in order to provide operating power to meter 32.

Figure 3:
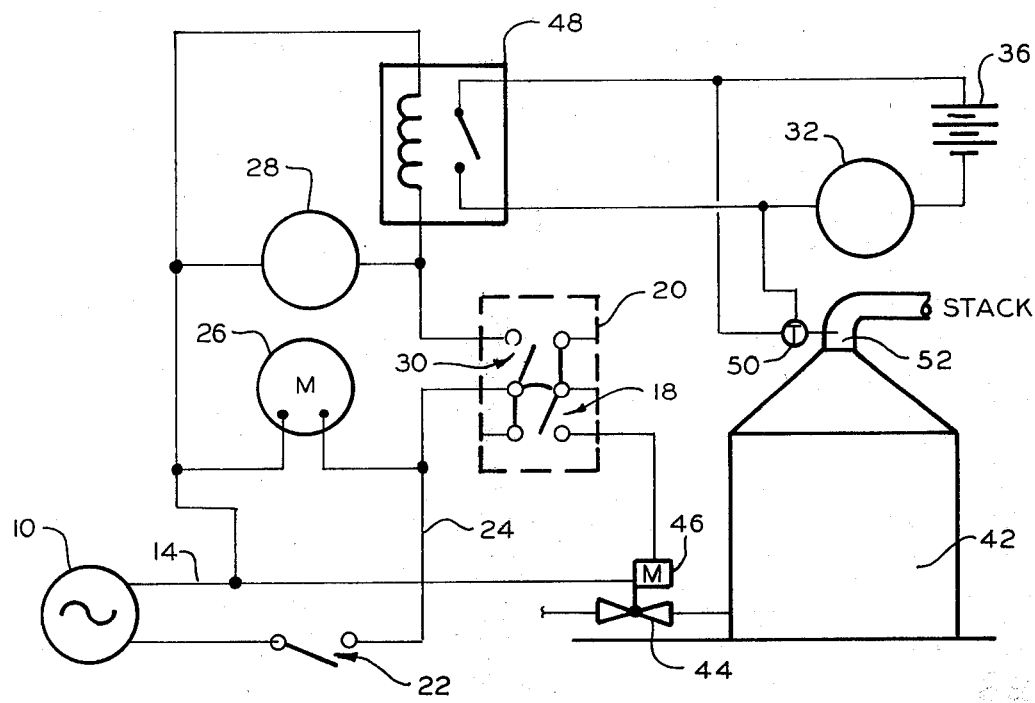

FIG. 3 illustrates a form of the invention which may be used when each occupancy unit of the multi-unit building is heated by an individual gas or oil burning heater. Again, common reference numerals are used for electrical sources 10 and 36, lines 14, 16 and 24, switch 22, contacts 18 and 30 of thermostat 20, fan motor 26 and compressor 28. Fuel is provided from a tank, gas main, or the like, to furnace 42 through valve 44. The valve is opened and closed under the control of motor 46, which is connected to source 10 through thermostat contacts 18. Relay 48 is closed to operate meter 32 whenever compressor 28 is in operation. Also, thermostat switch 50 is positioned in the bonnet or stack 52 of furnace 42 to close the circuit of meter 32 whenever the temperature of the flue gases indicate that fuel is being burned.

Figure 4:
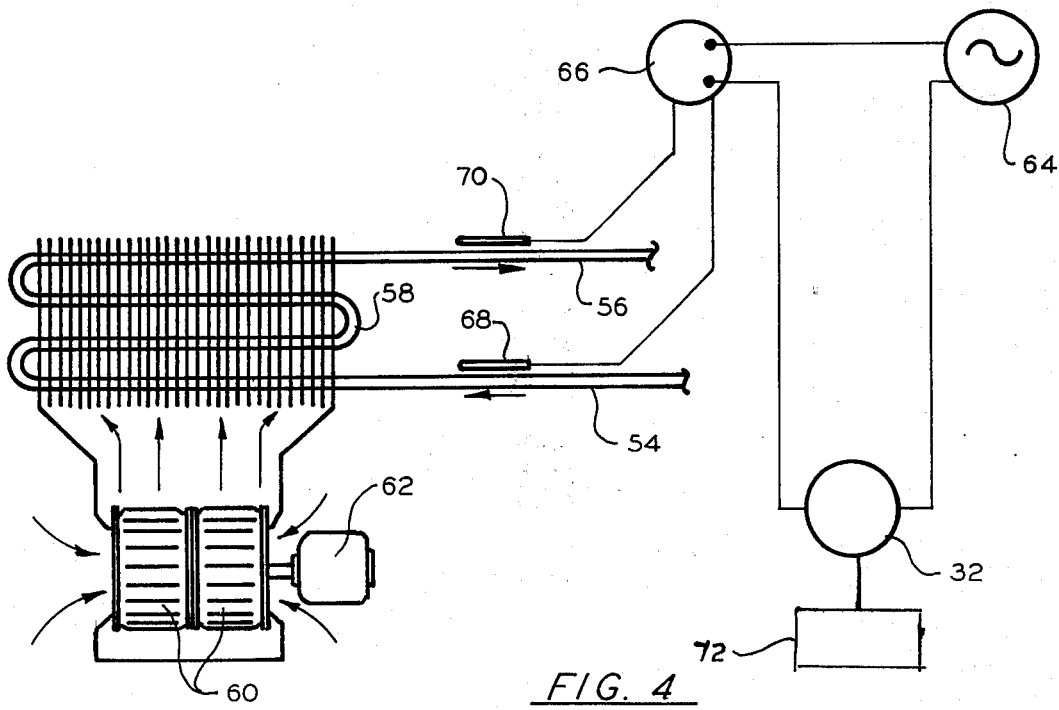

The invention is shown in FIG. 4 in an application wherein heating or cooling is provided by a fluid-to-air heat exchanger wherein the fluid medium, e.g., water, is heated or chilled at a remote location, and provided as demanded to the individual exchangers in each occupancy unit. The water is provided through line 54 and discharged through line 56, giving up or absorbing heat to the air surrounding coil 58 within the exchanger. A blower assembly, illustrated as centrifugal fans 60 driven by motor 62, drives air through the exchanger to be heated or cooled, and to vary room temperature up or down.

Elapsed time meter 32 is connected on one side to voltage source 64, and on the other side to differential thermostat 66. The latter senses the water temperature in both supply and return lines 54 and 56 through appropriate probes, or the like, numbered 68 and 70, respectively. A temperature differential in excess of some predetermined value, e.g., 5° F, closes the contacts of thermostat 66, thereby connecting meter 32 to voltage source 64. A temperature differential of the necessary magnitude will exist only when water is flowing and the blower assembly is running. Thus, although the primary energy input used to heat or cool the water or other fluid used to provide comfort temperature control is at a centralized location, an accurate indication of the demand placed on such energy input by each individual occupancy unit is still provided.

Elapsed time meter 32, used in each embodiment of the invention, may be of the type showing either an analog or a digital readout of the accumulated time for which the unit is connected to the power source since the last reset or reading. Conversely, the meter may be in the nature of a pre-set timer which indicates the time remaining, rather than time accumulated.

The differential thermostat of FIG. 4 could, of course, be employed in other ways than that shown. For example, it could be responsive to the difference in the temperature of air entering and leaving the heat exchanger, or to a combination of incoming water and outgoing air, etc. Likewise, in the other illustrated applications the elapsed time meter could be actuated by a differential thermostat responsive to the temperature difference of the refrigerant entering and leaving the compressor, or the compressor and evaporator.

Elapsed time meter 32 in the FIG. 4 application is connected to a signal device, diagrammatically indicated at 72. Device 72 may comprise a visible element, such as a light, or an audible element, such as a buzzer or bell, actuated when a preselected amount of time has accumulated on meter 32, or when the preset time has run down to zero. Device 72 could also be in the nature of a switch, or be connected to switch 22, to prevent further opertion of the temperature control unit until the device and/or meter is reset.

What is claimed is:

1. A system for indicating relative amounts of energy consumed for comfort temperature control by individual occupancy units of a multi-unit structure wherein the actual total energy use is metered for the entire structure, said system comprising:
    a. a plurality of temperature control units, each associated with one of the individual occupancy units to alter the temperature of room air therein, and all operated from a common energy source;
    b. a control switch associated with each of said temperature control units, the latter being operable by energy from the common source to alter room air temperature in accordance with the selective setting of said control switch;
    c. an electrically operated elapsed time meter associated with each of said temperature control units; and
    d. means for actuating said meter to indicate the elapsed time of operation of its associated temperature control unit to alter room air temperature.

2. The invention according to claim 1 wherein said actuating means comprising a normally open relay which closes to actuate said elapsed time meter in response to closure of said control switch.

3. The invention according to claim 2 wherein said control switch comprises a thermostat sensitive to the room temperature of the occupancy unit with which it is associated.

4. The invention according to claim 3 wherein said common energy source is an electrical power supply and each of said temperature control units includes a refrigerant compressor.

5. The invention according to claim 4 wherein said temperature control units each further include an electrical resistance heater.

6. The invention according to claim 3 wherein said common energy source includes an electrical power supply and a combustible fuel, and each of said temperature control units includes a furnace for burning said fuel and a refrigerant compressor operated by said electrical power supply.

7. The invention according to claim 6 wherein said actuating means further comprises a temperature sensitive switch operable to actuate said elapsed time meter in response to the temperature in said furnace rising above a predetermined value.

8. The invention according to claim 1 and further including signal means operable in response to cumulative actuation of said elapsed time meter for a preselected time.

9. The invention according to claim 1 wherein said temperature control units each include a heat exchanger through which a medium is circulated to alter air temperature.

10. The invention according to claim 9 wherein said control switch comprises a differential thermostat responsive to the difference in temperature of said medium when entering and leaving said heat exchanger.

* * * * *

UNITED STATES PATENT OFFICE
CERTIFICATE OF CORRECTION

Patent No. 3,995,686　　　　　　　Dated December 7, 1976

Inventor(s) Herbert L. Laube

It is certified that error appears in the above-identified patent and that said Letters Patent are hereby corrected as shown below:

In the drawings, Figure 1 as it appears on the title page and on the first sheet of drawings is incorrect, the correct version should appear as shown on the attached sheet.

Signed and Sealed this

Seventeenth Day of October 1978

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 3,995,686    Dated December 7, 1976

Inventor(s) Herbert L. Laube

It is certified that error appears in the above-identified patent and that said Letters Patent are hereby corrected as shown below:

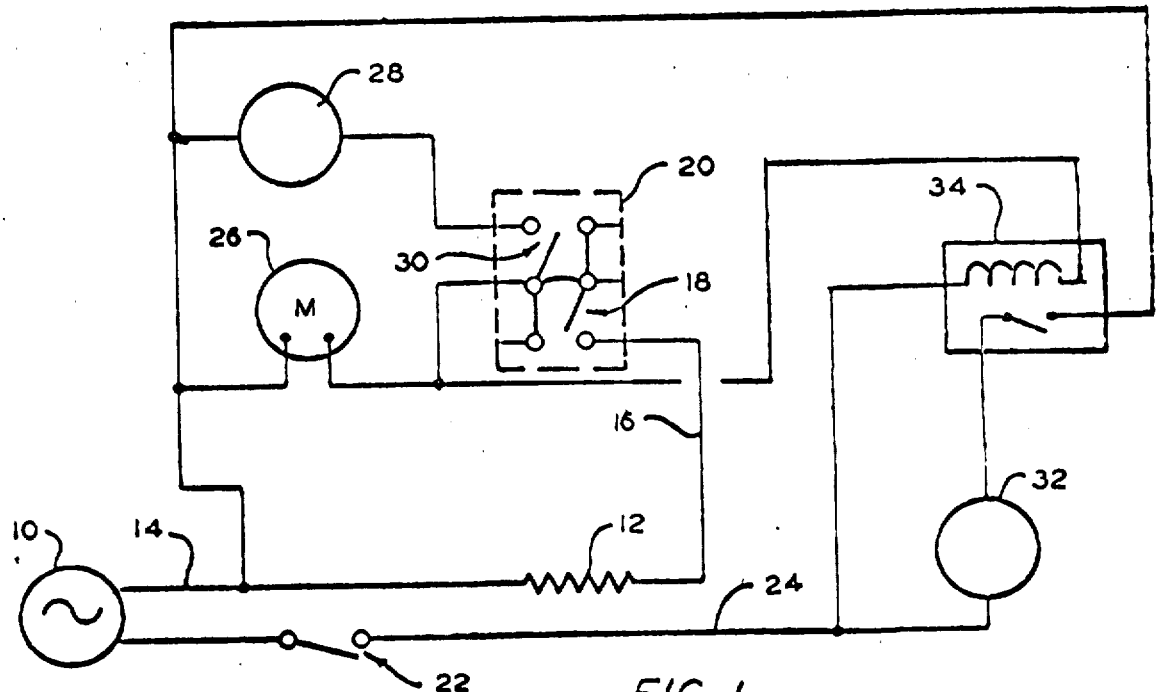

FIG. 1